United States Patent Office 3,296,325
Patented Jan. 3, 1967

3,296,325
CATALYST AND METHOD FOR PRODUCING
THE SAME
Orville Gross, Pleasure Ridge Park, and Bruce T. Alexander, Louisville, Ky., assignors to Chemetron Corporation, Chicago, Ill., a corporation of Delaware
No Drawing. Filed Dec. 11, 1963, Ser. No. 329,896
9 Claims. (Cl. 260—677)

This invention relates to a method of producing a catalyst useful in the selective hydrogenation of unsaturated hydrocarbons and especially to the selective hydrogenation of acetylenic hydrocarbons in gas mixtures containing olefins. More specifically, this invention relates to an improved iron-nickel-cobalt-chrome catalyst for such reactions and the process for producing the catalyst.

Because of the relative instability of the triple bond, acetylenic hydrocarbons may be hydrogenated more readily than hydrocarbons containing double bonds, and selective hydrogenation of acetylene in a gas mixture containing olefins is possible by utilization of a catalyst of appropriate activity to cause the hydrogenation of acetylene to occur at a much greater rate than the hydrogenation of the olefins. However, the problem is rendered much more complex when only small amounts of acetylene are present in the gas mixture and when it is necessary to completely hydrogenate the acetylene without appreciably lowering the olefin content in order to produce a gas mixture suitable for use as a synthesis intermediate. By way of example, gas mixtures consisting essentially of olefins and hydrogen for the production of polyethylene in general should not contain more than about 25 parts of acetylene per million parts of the mixture. Mixtures containing higher acetylene concentrations have been found to be unsuitable for the polymerization reaction.

An object of this invention is to provide a catalyst which is capable of hydrogenating small amounts of acetylenes in olefin gas mixtures in such manner that the reaction proceeds virtually to completion at a high space velocity to reduce the acetylene content to a few parts per million, and since any olefins which are hydrogenated in a gas mixture containing same are effectively lost, a related object is to provide an acetylene hydrogenation catalyst which is relatively inactive in promoting hydrogenation of olefins even in mixtures containing a major proportion of olefins.

A further object is to provide a catalyst which is relatively inactive in polymer formation in the olefin stream and products relatively little carbon deposit on the catalyst, thereby attaining longer effective life and higher mechanical strength.

Another object is to provide a catalyst which has a relatively long effective life, good resistance to thermal shock, high mechanical strength even after long use, and resistance to the effects of poisons such as carbon monoxide which are usually present in hydrocarbon mixtures derived from petroleum.

An additional object of the invention is to provide a catalyst which is resistant to sulfur poisoning and which is effective in selectively reducing acetylenes in olefins streams containing relatively large quantities of organic sulfur.

Another object is to provide a catalyst which may be readily regenerated after continued use and restored virtually to its original activity with its physical properties unimpaired.

These and other objects will be apparent from and are achieved in accordance with the following disclosure.

We have discovered that a superior selective hydrogenation catalyst may be formed by impregnating or otherwise applying to a carrier composed substantially of silica, a combination of metals of Group VIIIB and Group VIB of the Periodic Table, with iron oxide. This combination of metals is customarily applied to the aforementioned carrier in the form of salts or sulfides which on calcining a temperatures in the range of 300° to 1100° F. are partially converted to oxides. During the initiation of the selective hydrogenation reaction in an olefin stream containing hydrogen, the metal oxides are reduced to a lower oxidation state or to the respective metals on the carrier and serve as an effective selective hydrogenation catalyst. The Group VIIIB metal is selected from Series 4, such as cobalt or nickel, and the Group VI metal is selected from Group VIB, such as chromium or molybdenum. Ordinarily, nickel, cobalt, iron, and chromium oxides are used in combination, although other combinations are also operative.

In a preferred form of the invention, the Group VIIIB metals are applied to the carrier in the form of sulfates. The sulfates on calcination at 300°–950° F. are only partially converted to oxides and the resulting catalyst contains a substantial amount of sulfur. The sulfur appears to be partially bound in the sulfate form to the iron oxide component and the latter acts as a sulfur "sink" in that it retains and releases sulfur. The sulfate serves as a temperature limit control and contributes to the selectively of the catalyst. As the temperature of the hydrogenation operation increases due to exothermic reactions, the sulfate group appears to be partially reduced to the sulfide group and the latter acts as a poison to inhibit the hydrogenation reactions. As the latter are decreased in speed, the temperature also is decreased and the reduction of sulfate to sulfide stops, thereby preventing complete inhibition of the hydrogenation reactions.

Sulfur for temperature control can also be introduced as sulfides. For example, cobalt and nickel sulfides can be used instead of cobalt and nickel sulfates. Likewise, hydrogen sulfide or organic sulfur compounds can be injected into the gas stream, the hydrogen sulfide being absorbed by the iron oxide sulfur "sink." The sulfides in the catalyst are oxidized in part to sulfates and the latter operate to control temperature as described above. The preferred sulfur content of the catalyst is 1.5–2.5% by weight, although sulfur values of 1% to 4% are satisfactory. The amount of sulfur which is desirable in the finished catalyst depends upon the operating conditions under which the catalyst is used. At low temperatures and pressures (e.g., 200–300° F. and 100–300 p.s.i.g.) sulfur contents of 1% to 2.5% are desirable, while at higher temperatures and pressures (e.g., 300–400° F. and 300–500 p.s.i.g.) higher sulfur values in the range of 2.5% to 5% are preferred.

The Group VIIIB and Group VIB metals can be applied to the carrier in the form of aqueous solutions. Salts such as cobalt nitrate and chloride and nickel nitrate and acetate can be used, but it is preferred to add an equivalent amount of sulfate with such salts, in order to maintain the desired sulfur content. This can be done by concurrent addition of sulfuric acid or sodium sulfate.

Chromium and molybdenum are conveniently added in the form of their oxides (e.g., chromic acid) but salts may also be used (e.g., chromium nitrate or sulfate, molybednum chloride).

The relative amounts of the respective Group VIIIB and Group VIB metals are not believed to be critical, particularly since adjustment of activity and selectivity can be readily accomplished by varying the proportions of active material and carrier. The Group VIIIB metal or metals, in oxide form, can vary from about 5% to 15–20% by weight of the total catalyst, the amount of nickel preferably exceeding the amount of cobalt. The Group VIB metal or metals in oxide form can vary from 0.1% to 2% by weight of the total catalyst.

The carrier should consist essentially of silica but ordinarily small amounts (5 to 15%) of other oxides, such as titania, iron oxides and alkali and alkaline earth metal oxides are not disadvantageous. Ordinarily, the amount of silica is that sufficient to provide adequate mechanical strength and often may be in the range of 25% to 35% of the total catalyst weight.

The iron oxide usually constitutes from about 40% to about 60% of the total catalyst weight. The iron oxide can be any of the common oxides of iron, such ferric oxide, ferrous oxide, ferroso-ferric oxide ($Fe_3O_4$), iron sesquioxide ($Fe_2O_3$), as well as precipitated iron oxides, calcined copperas and natural ores. During calcination the various iron oxides are converted to ferric oxide and during the hydrogenation operation the latter is partially reduced to ferrous oxide, so any of the iron oxides are equivalent, as are other iron compounds (e.g., iron carbonates) which are converted to iron oxides during calcination.

Although the catalytically active material has been described herein as a mixture of oxides or sulfides of metals of Groups VIB and VIIIB, such as iron, nickel and chromium, or iron, cobalt and chromium or other combinations, it is to be understood that the exact chemical nature of the catalytic material is not known. It may be a mixture of oxides, or it may be a compound formed between the metal oxides or metal sulfides or a mixture of the two or other types of compounds or mixtures thereof.

The catalysts of this invention are effective in selectively hydrogenating acetylenic compounds in olefin gas streams to reduce the concentration of acetylenes to 10 p.p.m. or lower under a wide range of conditions. The temperature of the selective hydrogenation can vary from 200° to 600° F., the pressure from 25 to 350 p.s.i.g., the hourly space velocity up to 5000 volumes of gas per volume of catalyst, the steam concentration from 1% to 6% or higher, and organic sulfur content as high as 100 p.p.m. The catalysts are unusually resistant to poisoning and can be regenerated many times by oxidation with steam and air without loss of strength or breakage. They are both active and selective over wide ranges of space velocities and temperatures. They are insensitive to variations in sulfur levels of the fuel streams and do not require adjustment in operating temperature to compensate for variations in sulfur levels. They have the advantage of decreasing in activity with decreases in operating temperature, and vice versa, in contrast to other selective hydrogenation catalysts which show the inverse effect.

The iron oxide in the catalysts has a great affinity for sulfur and for carbon monoxide. When these materials are present in excess in the feed stream, they are taken up by the iron oxide, and when they are not present in excess, they are released by the iron oxide.

The iron oxide is both a carrier for the Group VIIIB and Group VIB metals and a mildly active hydrogenation catalyst. By virtue of the latter property, it is possible to use lesser quantities of catalytic metals (i.e., nickel, cobalt, chromium and molybdenum) and still obtain an active catalyst. The iron oxide serves as a diluent and thus renders the catalysts highly selective in the hydrogenation of acetylenes. For instance, the catalysts of this application reduce butadiene to butylene whereas commercial selective hydrogenation catalysts reduced butadiene to butane.

The silica is an inert carrier of low surface area, that is, of not more than about 50 square meters per gram, and preferably less than 10 square meters per gram. The low surface area of the silica and iron oxide suppress polymer formation, thus giving longer operating cycles between regenerations. The common forms of finely divided silica are suitable, such as diatomaceous earth, colloidal silica, and kieselguhr.

The catalyst compositions are pressed into spheres, tablets or other shapes, or are extruded or granulated, and then calcined at temperatures in the range from 300° F. to 1000° F. for periods of 5–15 hours, preferably at 900–950° F. for about 8 hours.

The catalysts of this application are activated prior to use by reduction in a stream containing 2–20% hydrogen for 2–16 hours at 450–850° F. whereby part of the cobalt, nickel, chromium and molybdenum compounds are reduced to catalytic metals.

The following examples illustrate the preparation of catalysts within the scope of this invention and the use of such catalysts in the selective hydrogenation of olefin streams to remove acetylenes without substantial loss of the olefins and without serious polymer formation and carbon deposit on the catalyst. These examples are provided for the purposes of illustration only and are not intended to limit the invention. It will be apparent to those skilled in the art that numerous modifications in materials, concentrations, times and other operating conditions may be made without departing from the invention. Likewise, equivalent materials may be substituted for those disclosed in the examples without departure from the invention.

Example 1

A catalyst containing 8.9% $NiSO_4$, 1.6% $CoSO_4$, 52.0% $Fe_2O_3$, and 0.11% $Cr_2O_3$ in admixture with a support of silicon dioxide was prepared according to the following procedure: 102 parts of silicon dioxide (Standard Filter Cel, Johns Manville Company), 150 parts iron oxide ($Fe_2O_3$, Williams No. 1085), 41.1 parts nickel sulfate hexahydrate, 8.7 parts cobalt sulfate heptahydrate and 0.9 part chromic acid were mixed together thoroughly and made into a paste by adding 30 parts of a colloidal silica (Ludox, 30% $SiO_2$) and 250 parts water. This paste was dried at a temperature of 240° F. for a period of 16 hours and then pulverized to pass a nine mesh screen. To the dried mixture was added sufficient graphite lubricant to facilitate forming the material into ¼" x ¼" cylinders. After forming, the cylinders were dried for 16 hours at a temperature of 230° F. and further calcined according to the following schedule:

One hour at 300° F.
One hour at 450° F.
One hour at 650° F.
Eight hours at 950° F.

The catalyst prepared above had a surface area of 26 square meters per gram. It gave excellent results in the purification of an olefin rich stream over a wide range of temperature and space velocity. The addition of organic sulfur to the feed gas had little or no observable effect on the catalyst activity.

The subject catalyst exhibited good selectivity and activity in the purification of an ethylene rich stream at temperatures of 300° to 450° F. and space velocities of from 1200 to 4800.

Table I below shows the performance of this catalyst in the selective hydrogenation of acetylene in an ethylene stream at 100 p.s.i.g. system pressure. The gas stream consisted of 34.0% methane, 32.3% ethylene, 32.4% hydrogen, 1.1% propylene and 0.20% acetylene.

TABLE I

| Hours on Stream | Temp., °F. | Space Velocity | Inlet Sulfur, COS, p.p.m. | Mol Percent Olefins Hydrogenated | $C_2H_2$ p.p.m. In | $C_2H_2$ p.p.m. Out |
|---|---|---|---|---|---|---|
| 2 | 350 | 1,200 | 0 | 1.0 | 2,300 | 0 |
| 5 | 350 | 2,400 | 0 | 0.4 | 2,300 | 0 |
| 7 | 450 | 2,400 | 0 | 0.4 | 2,300 | 0 |
| 23 | 450 | 1,200 | 0 | 0.8 | 2,300 | 0 |
| 26 | 450 | 3,600 | 0 | 0.2 | 2,300 | 0 |
| 29 | 350 | 3,600 | 0 | 0.2 | 2,300 | 16 |
| 31 | 300 | 2,400 | 0 | 0.8 | 2,300 | 24 |
| 34 | 450 | 4,800 | 0 | 0.0 | 2,300 | 20 |
| 36* | 450 | 2,400 | 5.3 | 0.0 | 2,300 | 6 |
| 40 | 450 | 1,200 | 5.3 | 0.0 | 2,300 | 0 |
| 56 | 350 | 1,200 | 5.3 | 0.0 | 2,300 | 6 |

*New feed gas: 32.4% methane, 32.3% ethylene, 32.4% hydrogen, 1.1% propylene, 1.6% carbon monoxide, 0.2% acetylene and 5.3 p.p.m. sulfur as carbonyl sulfide.

*Example 2*

A catalyst containing 7.67% $NiSO_4$, 1.81% $CoSO_4$, 51.65% $Fe_2O_3$ and 0.50% $Cr_2O_3$, in admixture with a support of silicon dioxide, was prepared according to the following procedure: 110 parts silicon dioxide (Standard Filter Col), 200 parts iron oxide (Williams No. 1085), 50 parts nickel sulfate hexahydrate, 12.5 parts cobalt sulfate heptahydrate, and 1.3 parts chromic acid were mixed together thoroughly and made into a paste by adding 80 parts of a colloidal silica (Nalcoag, 50% $SiO_2$) and 90 parts water. The resultant paste was then extruded to form particles of ¼" diameter and varying lengths of ¼" to ½". After forming, the extrudates were dried and calcined according to the following schedule:

One hour at 300° F.
One hour at 450° F.
One hour at 650° F.
Eight hours at 950° F.

Table II presents data obtained after 120 days continuous operation with the above described catalyst in an ethylene-rich stream.

TABLE II

Operating conditions:
  Space velocity _____ 2500
  Inlet temperature _____ °F__ 400
  Outlet temperature _____ °F__ 408
  Pressure _____p.s.i.g__ 237

| Component | Concentration by volume Feed | Concentration by volume Product |
|---|---|---|
| Acetylene, $C_2H_2$ | 0.45% | 10 p.p.m. |
| Monoalkyl Acetylenes, $RC_2H$ | 300 p.p.m. | 45 p.p.m. |
| Propadiene | 0.13% | 185 p.p.m. |
| Sulfur, Total | Nil | Nil. |
| Ethylene | 27.6% | 27.6%. |
| Propylene | 6.6% | 6.5%. |
| Butane | 100 p.p.m. | 200 p.p.m. |
| Isobutane | 100 p.p.m. | 100 p.p.m. |
| Butene-1+Isobutene | 0.38% | 0.45%. |
| Butene-2 trans | 0.05% | 0.36%. |
| Butene-2 cis | 0.05% | 0.17%. |
| Butadiene-1,3 | 0.98% | 0.41%. |

The above data indicate essentially complete removal of $C_2H_2$. Propadiene and methyl acetylene were reduced from 1600 p.p.m. to 230 p.p.m. The propylene and ethylene were essentially unchanged. Approximately 58% of the butadiene present was hydrogenated to butene.

*Example 3*

A catalyst prepared as described in Example 2 was reduced at 650° F. for 4 hours in a hydrogen-containing stream and then evaluated in an ethylene-rich stream having the following composition.

| Component: | Volume percent |
|---|---|
| $H_2$ | 8.9 |
| $CH_4$ | 29.4 |
| $C_2H_4$ | 30.2 |
| $C_2H_6$ | 9.0 |
| $C_3H_6$ | 14.5 |
| $C_3H_8$ | 1.0 |
| $C_2H_2$ | 0.18 |
| $N_2$ | 5.7 |
| CO | p.p.m. 300 |
| $O_2$ | p.p.m. 100 |
| Total sulfur | p.p.m. 3 |

Operating conditions:
  Inlet temperature _____ °F__ 250
  Space velocity _____ 3000
  Pressure _____p.s.i.g__ 250

Table II contains an analysis of the feed and product gases after 62 hours of continuous operation.

TABLE III

| | Concentration by volume Feed | Concentration by volume Product |
|---|---|---|
| $C_2H_4$ | 30.2% | 30.2%. |
| $C_3H_6$ | 14.5% | 14.5%. |
| $C_2H_2$ | 1800 p.p.m. | 7 p.p.m. |

The above data indicate the excellent selectivity of this catalyst as evidenced by almost complete removal of acetylene and a negligible loss of unsaturates through hydrogenation.

We claim:

1. A catalyst suitable for the selective hydrogenation of acetylenes in the presence of olefins, comprising about 40–60% iron oxide and about 25–35% silica of low surface area not greater than about 50 square meters per gram on which is supported about 5–20% of a metal oxide of a metal of Group VIIIB Series 4 of the Periodic Table and about 0.1–2% of a metal oxide of a metal of Group VIB of the Periodic Table.

2. A catalyst as defined by claim 1 wherein the silica consists of at least 85% $SiO_2$.

3. A catalyst as defined by claim 2 wherein the metals of Group VIIIB are selected from the class consisting of cobalt and nickel.

4. A catalyst as defined by claim 3 wherein the metals of Group VIB are selected from the class consisting of chromium and molybdenum.

5. A catalyst as defined by claim 4 containing 1% to 5% sulfur by weight.

6. A catalyst suitable for the selective hydrogenation of acetylenes in the precence of olefins, comprising a carrier composed of at least 85% $SiO_2$, said carrier constituting 25% to 35% of the total catalyst and having a surface area not greater than about 50 square meters per gram; 40% to 60% iron oxide; 5% to 20% cobalt, nickel or mixtures of cobalt and nickel calculated as oxides; 0.1% to 2% of metals of Group VIB of the Periodic Table, calculated as oxides; and 1% to 5% sulfur.

7. A selective hydrogenation catalyst as defined by claim 6 composed of 25%–35% silica of surface area less than 5 square meters per gram, 40%–60% ferric oxide, 1.5% to 15% nickel sulfate, 0.25% to 3.5% cobalt sulfate, 0.1% to 2% chromic oxide, and 2% to 10% colloidal silica, having a sulfur content of 1–5%.

8. Method of selectively hydrogenating acetylenic hydrocarbons to olefinic hydrocarbons in a gas stream containing olefins and an excess of hydrogen, which comprises contacting said gas stream with a catalyst as defined by claim 1 at a temperature in the range from 200° to 600° F. and a pressure in the range from 25 to 350 p.s.i.g.

9. Method of selectively hydrogenating acetylenic hydrocarbons to olefinic hydrocarbons in a gas stream containing olefins and an excess of hydrogen, which comprises contacting said gas stream with a catalyst composed of 25–35% silica of surface area not greater than 5 square meters per gram, 40–60% ferric oxide, 1.5–15% nickel sulfate, 0.25–3.5% cobalt sulfate, 0.1–2% chromic oxide, 2–10% colloidal silica and 1–5% sulfur at a temperature in the range from 200° to 600° F., a pressure in the range of 25 to 350 p.s.i.g., an hourly space velocity not greater than 5000 volumes of gas per volume of catalyst and a steam concentration of 1–6% by volume.

References Cited by the Examiner

UNITED STATES PATENTS

| | | | |
|---|---|---|---|
| 1,908,286 | 5/1933 | Dorrer | 208—216 |
| 2,775,634 | 12/1956 | Nowlin | 260—677 |
| 3,003,008 | 12/1961 | Fleming et al. | 260—677 |
| 3,205,281 | 9/1965 | Fleming et al. | 260—683 |

ALPHONSO D. SULLIVAN, *Primary Examiner.*